United States Patent
Schönbauer et al.

(10) Patent No.: US 9,276,446 B2
(45) Date of Patent: Mar. 1, 2016

(54) ACTIVE PART OF AN ELECTRICAL MACHINE HAVING INCLINED COILS IN THE WINDING HEAD AREA

(75) Inventors: Norbert Schönbauer, Bad Füssing (DE); Axel Möhle, Berlin (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 380 days.

(21) Appl. No.: 13/819,160

(22) PCT Filed: May 11, 2011

(86) PCT No.: PCT/EP2011/057614
§ 371 (c)(1),
(2), (4) Date: Feb. 26, 2013

(87) PCT Pub. No.: WO2012/025260
PCT Pub. Date: Mar. 1, 2012

(65) Prior Publication Data
US 2013/0154429 A1 Jun. 20, 2013

(30) Foreign Application Priority Data

Aug. 27, 2010 (DE) .......................... 10 2010 039 871

(51) Int. Cl.
*H02K 3/12* (2006.01)
*H02K 15/00* (2006.01)
(Continued)

(52) U.S. Cl.
CPC .. *H02K 3/12* (2013.01); *H02K 3/04* (2013.01); *H02K 3/28* (2013.01); *H02K 3/505* (2013.01);
(Continued)

(58) Field of Classification Search
CPC ........... H02K 3/12; H02K 1/145; H02K 3/04; H02K 3/28; H02K 15/085; H02K 15/0025; H02K 15/0037

USPC .......................... 310/194, 208, 260, 270, 198
IPC .......................................................... H02K 3/12
See application file for complete search history.

(56) References Cited

U.S. PATENT DOCUMENTS

| 5,534,739 A | 7/1996 | Heidelberg et al. |
| 5,886,444 A * | 3/1999 | Enomoto ................. H02K 3/12 310/179 |

(Continued)

FOREIGN PATENT DOCUMENTS

| DE | 10 2005 059 846 A1 | 6/2007 |
| DE | 10 2009 032 883 A1 | 1/2011 |

(Continued)

OTHER PUBLICATIONS

International Search Report issued by the European Patent Office in International Application PCT/EP2011/057614.
(Continued)

*Primary Examiner* — John K Kim
(74) *Attorney, Agent, or Firm* — Henry M. Feiereisen LLC.

(57) ABSTRACT

An active part of an electrical machine has a carrier, a plurality of coils which are arranged on the carrier and which each include a plurality of sub-conductors and a winding head area, in which the coils project out of the carrier in a curved shape, respectively and are connected to one another. At least one of the plurality of coils has a coil arc in the winding head area, and the center line of the coil runs in one plane in the coil arc. The sub-conductors of one coil run parallel to the plane in the coil arc of the coil and themselves in each case form sub-conductor arcs. The vertices of the sub-conductor arcs of the coil form a line of inclination which runs at an angle to the plane.

12 Claims, 3 Drawing Sheets

(51) Int. Cl.
*H02K 3/28* (2006.01)
*H02K 3/04* (2006.01)
*H02K 3/50* (2006.01)
H02K 15/085 (2006.01)
H02K 1/14 (2006.01)

(52) U.S. Cl.
CPC ........ *H02K 15/0025* (2013.01); *H02K 15/0037* (2013.01); H02K 1/145 (2013.01); H02K 15/085 (2013.01)

(56) References Cited

U.S. PATENT DOCUMENTS

| | | | |
|---|---|---|---|
| 6,229,241 B1 | 5/2001 | Ishigami et al. | |
| 7,569,966 B2 * | 8/2009 | Saito | H02K 3/12 310/179 |
| 8,093,777 B2 * | 1/2012 | Stiesdal | H02K 3/12 310/198 |
| 8,174,160 B2 * | 5/2012 | Stiesdal | H02K 3/12 310/184 |
| 8,847,458 B2 * | 9/2014 | Le Besnerais | H02K 3/12 310/201 |
| 2007/0145852 A1 * | 6/2007 | Schon | H02K 3/12 310/180 |
| 2010/0066195 A1 * | 3/2010 | Stiesdal | 310/198 |
| 2010/0164319 A1 | 7/2010 | Metsberg et al. | |
| 2011/0291423 A1 | 12/2011 | Germishuizen et al. | |
| 2013/0154429 A1 * | 6/2013 | Schonbauer et al. | 310/208 |

FOREIGN PATENT DOCUMENTS

| | | |
|---|---|---|
| EP | 1 643 619 A2 | 4/2006 |
| JP | 58166271 A | 10/1983 |
| WO | WO 92/05618 A1 | 4/1992 |
| WO | WO 2008/107513 A1 | 9/2008 |

OTHER PUBLICATIONS

Handbuch der Wickeltechnik elektrischer Maschienen [*Handbook of Winding Technique of Electric Machines*]; Bala, C., Fetita, Al., Leiter, V.: vol. 2, Berlin, Verlag Technik; 1976, p. 119; 1976.

* cited by examiner

ACTIVE PART OF AN ELECTRICAL MACHINE HAVING INCLINED COILS IN THE WINDING HEAD AREA

CROSS-REFERENCES TO RELATED APPLICATIONS

This application is the U.S. National Stage of International Application No. PCT/EP2011/057614, filed May 11, 2011, which designated the United States and has been published as International Publication No. WO 2012/025260 and which claims the priority of German Patent Application, Serial No. 102010039871.3, filed Aug. 27, 2010, pursuant to 35 U.S.C. 119(a)-(d).

BACKGROUND OF THE INVENTION

The invention relates to an active part of an electrical machine with a carrier and with a plurality of coils, which are arranged on the carrier and which each comprise a plurality of sub-conductors. In addition, the active part has a winding head area, in which the coils project out of the carrier in an arced shape and are connected to one another. At least one of the plurality of coils has a coil arc in the winding head area, and the center line of the coil runs in one plane in the coil arc. The sub-conductors of one coil run parallel to the plane in the coil arc of the coil and themselves in each case form a sub-conductor arc.

Electrical machines such as motors, generators and transformers each have one or more active parts which are magnetically active. A motor, for example, has a stator and a rotor as active parts.

Coils may be inserted or enclosed in the stator and/or rotor of a motor or generator. The coils are then typically located in or on a laminated core. The coils usually project out of the front faces of cylindrical laminated cores and together form a winding head of the rotor or stator.

The winding head of electrical machines belongs to the magnetically inactive parts that do not contribute to torque formation. It is therefore desirable to keep the conductor length and the overhang of the winding head as low as possible, to avoid taking up space unnecessarily and to keep weight and losses to a minimum.

FIG. 1 shows, by way of example, a conventional winding head of a three-plane winding. This means that the (here) concentric coils 1, 2 and 3 are positioned one over the other on three levels or planes. The three coils project out of a laminated core 4. The coils 1, 2 and 3 are shown in a longitudinal section, in relation to the corresponding stator or rotor. The outer end of each coil in the winding head area 5 is shown here pointing vertically downward.

FIG. 2 shows a variant of a winding head. Here, too, the individual coils 1', 2' and 3' emerge initially vertically from the front face 6 of the laminated core 4. The first coil 1', as in the example shown in FIG. 1, is arced vertically downward. The end of the coil 1' therefore runs parallel to the front face 6. The end of the second coil 2', however, runs at a 45° angle to the front face 6. It therefore has a line of inclination 7 which is indicated by an arrow in FIG. 2. An inclined plane 8 is defined perpendicular to this line 7. The outer end of the coil 2' runs parallel to this inclined plane 8. If the coils 1', 2' and 3' are formed by sub-conductors, these sub-conductors lie one over the other perpendicular to the inclined plane 8.

The third coil 3' runs, in this sectional view, in a straight line out of the front face 6 of the laminated core 4. The inclined plane of this coil 3' therefore runs parallel to the front face 6. The inclined plane of the first coil 1', however, is at a 90° angle to the front face 6.

A characteristic of the classic embodiment of the winding heads shown in FIG. 1 and FIG. 2 is that they may be inclined at different angles and that all conductors and/or sub-conductors of the respective coil lie directly one over the other perpendicular to the respective inclined plane. The connections to be attached to the winding head make the winding protrude even further overall.

SUMMARY OF THE INVENTION

The object of this invention therefore consists in making an active part of an electrical machine, and its winding head area in particular, more compact.

According to the invention, this object is achieved by an active part of an electrical machine with a carrier, a plurality of coils, which are arranged on the carrier and which each have a plurality of sub-conductors, and a winding head area in which the coils project out of the carrier in the shape of an arc and are connected to one another, wherein at least one of the plurality of coils has a coil arc in the winding head area and the center line of the coil essentially runs in one plane in the coil arc, and the sub-conductors of the one coil in the coil arc of the coil run parallel to the plane and themselves in each case form sub-conductor arcs, wherein the vertices of the sub-conductor arcs of the coil form a line of inclination, which runs at an angle to the plane.

As a result of the angled course of the sub-conductors, space may advantageously be gained which may be used for connections, e.g. ring circuit, etc. This means that the winding head space can be put to better use overall, so that a more compact active part may ultimately be manufactured.

The active part is preferably designed as a stator or rotor. This enables the corresponding electrical machine to be constructed more compactly than a machine with a conventional stator and/or rotor with usual winding head design.

A connecting element can be arranged on the line of inclination of the sub-conductor arcs of the coil. In this way the angled positioning of the coil, in which a space gain is achieved compared to conventional coils, is used to accommodate connecting elements. In general the connecting elements can be fitted tightly to the coils at an angle, thereby saving installation space overall.

In a preferred embodiment the plurality of coils are distributed in the peripheral direction in the stator or rotor, and the planes of the adjacent coils are inclined relative to one another in the winding head area. This has the advantage that, even whilst the requisite distances for clearance and creepage are maintained, the active part and/or the rotor or stator are designed more compactly.

In particular, the planes of three adjacent coils may occupy e.g. the angles 0°, 45° and 90° in relation to a front face of the carrier from which the coils project. Thus the coils can also be arranged with regard to their inclination in the winding head area. In particular, the three adjacent coils can be assigned the phases U, V and W of a three-phase system.

The coils may, for example, be concentric coils. The invention can therefore be used generally for concentric and non-concentric coils.

Furthermore, the three coils may have different lengths. This is not critical for the effectiveness of the coils, but may bring advantages in terms of saving installation space. The inventive active part, as already mentioned, is preferably installed in a motor or a generator.

BRIEF DESCRIPTION OF THE DRAWING

This invention will be explained in greater detail on the basis of the attached diagrams, in which.

DETAILED DESCRIPTION OF PREFERRED EMBODIMENTS

The exemplary embodiments described in greater detail below represent preferred embodiments of the present invention.

Figure 3:
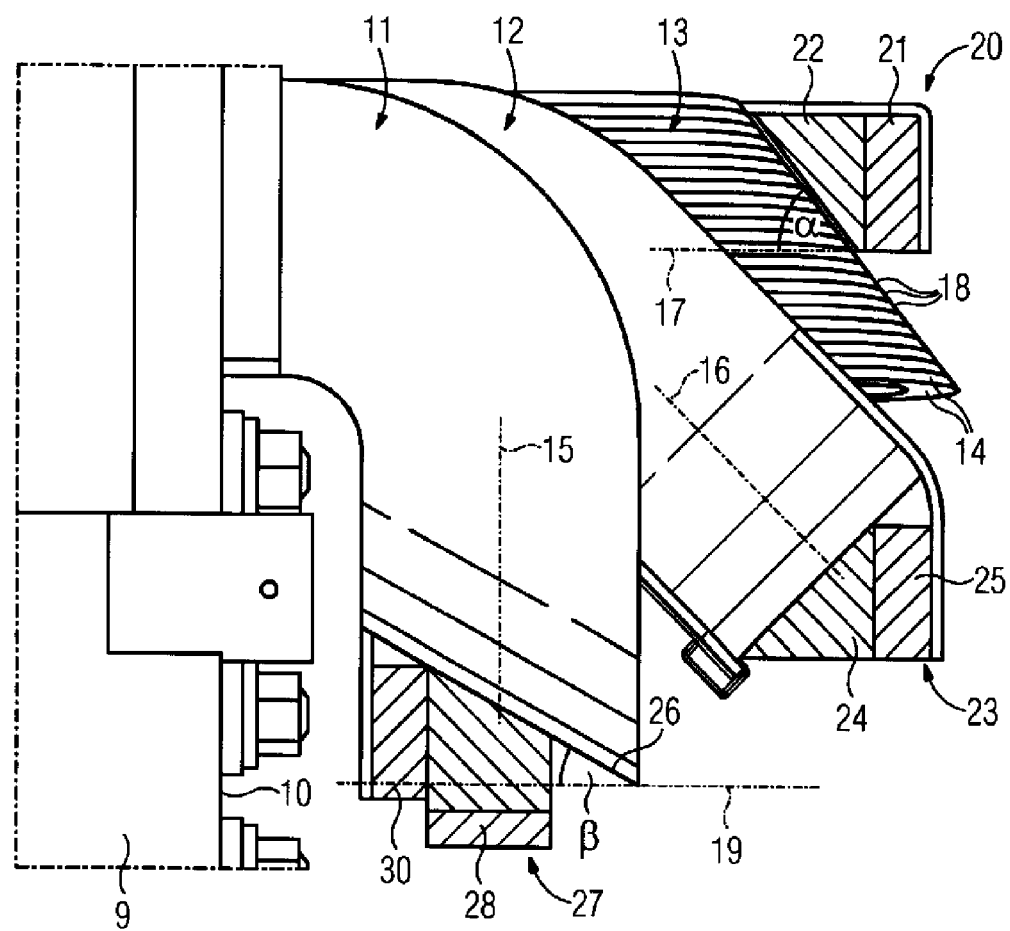
FIG. 3 shows a winding head of a three-plane winding with differently inclined coils according to the invention.
Figure 4:
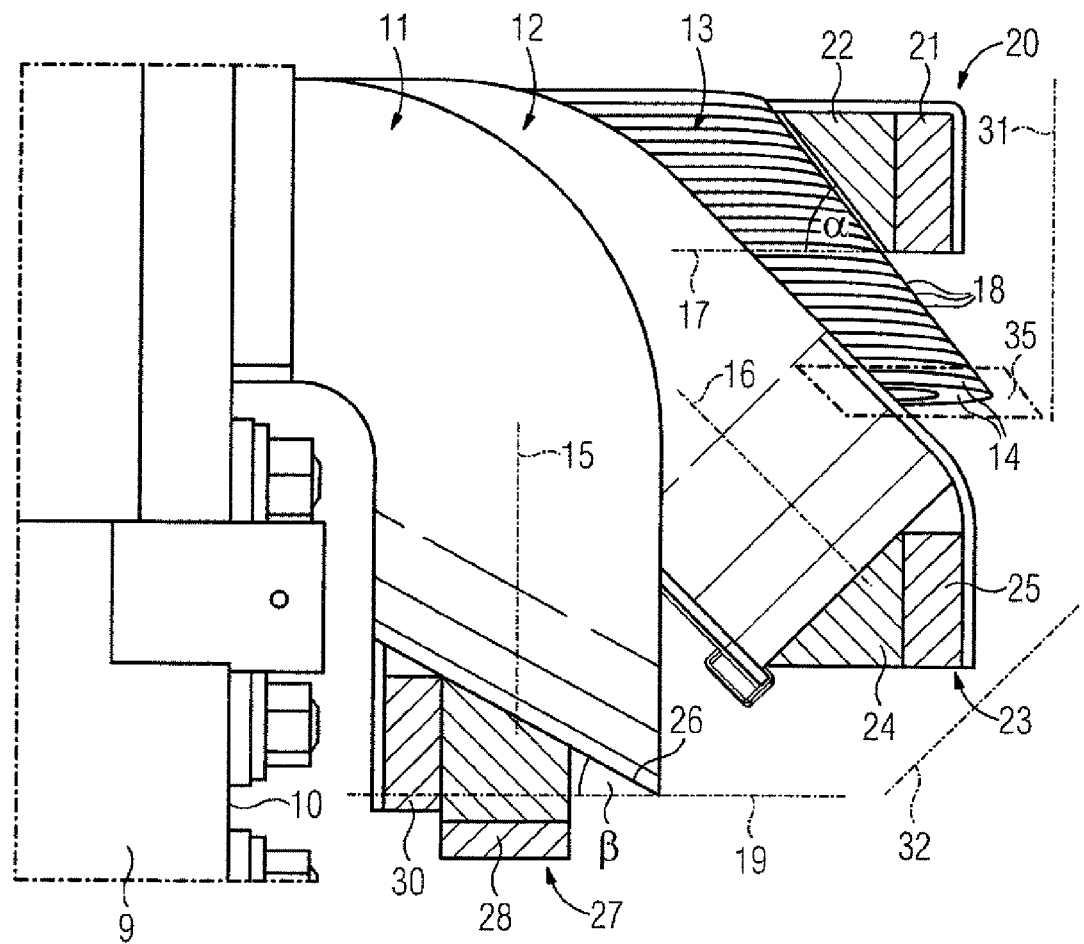
FIG. 4 substantially corresponds to FIG. 3 and shows further details of the three-plane winding according to the present invention.
Figure 5:
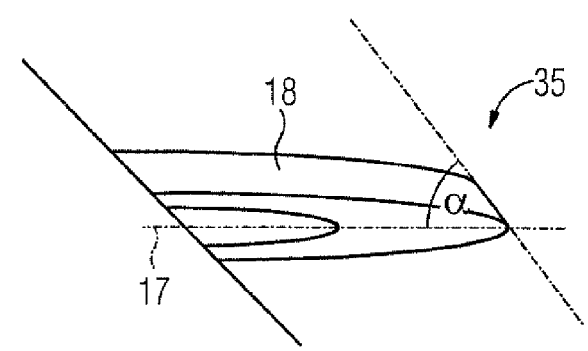
FIG. 5 shows a plane defined by a center line of one of the coils.

FIG. 3 illustrates, by way of example, a winding head area of a stator of an electrical machine. It shows the laminated core 9 of the stator. The cylindrical laminated core forms a carrier having a front face 10, from which (here) three coils 11, 12 and 13 project. The front two coils 11 and 12 are shown with an insulator, while the rear coil 13 is shown blank without insulator. The individual sub-conductors of the coil 13 can therefore be seen.

Figure 1:
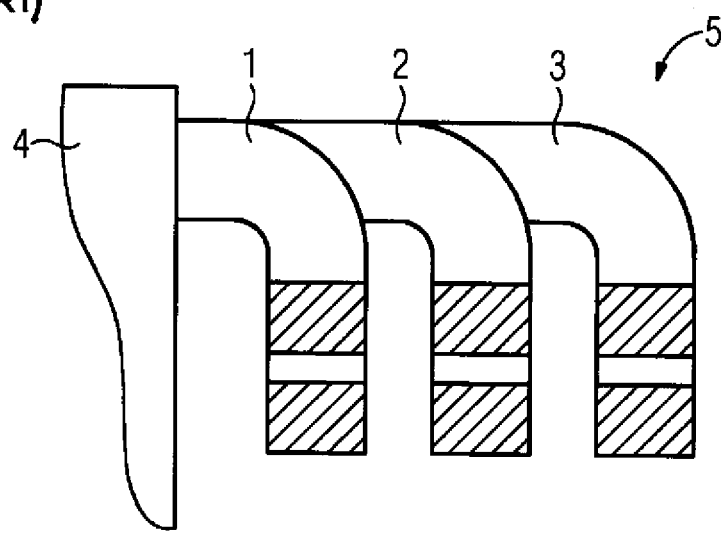
FIG. 1 shows a winding head of a three-plane winding with downwardly angled coils according to the prior art.
Figure 2:
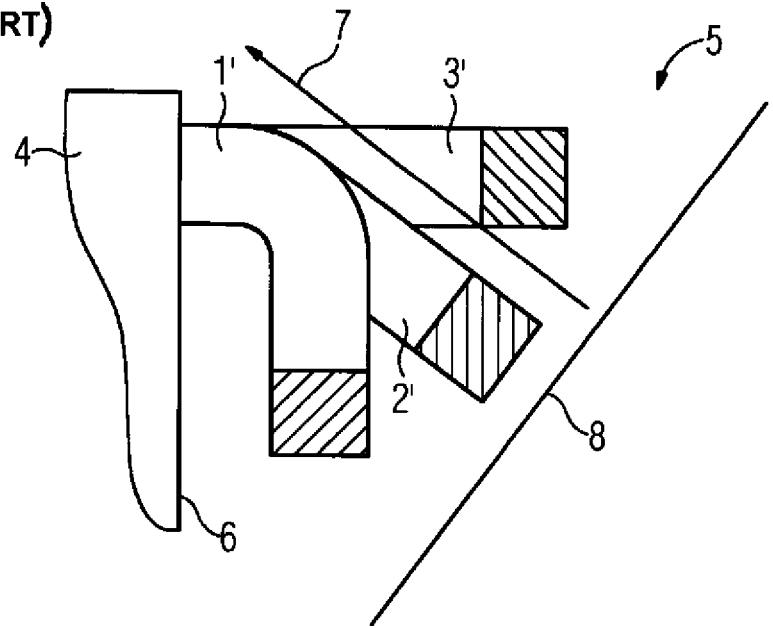
FIG. 2 shows a winding head of a three-phase winding with differently inclined coils according to the prior art.

Each of the coils 11, 12 and 13 runs out of the front face 10 of the laminated core 9, makes an arc in the winding head area and is led back into the laminated core 9. The center line 15, 16, 17 of each of the coils 11, 12, 13 runs in one plane in the respective coil arc. This plane is perpendicular to the respective included plane in the respective coil arc. This plane is perpendicular to the respective inclined plane of a coil (c.f. inclined plane 8 of coil 2' of FIG. 2). The inclined plane 19 of coil 11 is marked in FIG. 3. It extends at an angle of 90° to the front face 10 of the laminated core 9. Similarly, the inclined plane 32 of the coil 12 would have an angle of 45° and the inclined plane 31 of the coil 13 would have an angle of 0°.

The sub-conductors 14 of the coil 13 do not lie vertically one over the other with regard to the plane 35 which is defined by the center line 17. The sub-conductors 14 instead lie one over the other at an angle with reference to this plane 35. This means that the vertices 18 of the sub-conductor arcs lie on a line which, with the plane described by the center line 17, encloses the angle α. The contour of the coil, observed in a longitudinal view of the stator, therefore runs in the angle α at an angle in respect of the said plane. Accordingly, the contour or line of the vertices of the sub-conductor arcs occupies an angle of 90°-α in respect of the inclined plane running vertically in FIG. 3 (not marked in FIG. 3 for the sake of clarity).

Because the coil 13 runs at an angle on the outer edge of the winding head, space is gained which is used here for a connection device 20. This is normally used for connecting the individual coils 11, 12 and 13 to further coils of the stator. The connection device 20, for example, has a copper conductor 21, in order to implement a ring circuit. The copper conductor 21 is supported by an insulator 22 on the angled winding 13.

The coil 12 is not executed here at an angle to the plane, which is spanned by the plane of the curved center line 16. Its contour therefore also does not run at an angle, but parallel to its inclined plane. The inclined plane here is at a 45° angle in respect of the front face 10 of the laminated core 9. The vertex of the curved sub-conductors (under the visible insulator in FIG. 3) runs parallel to the inclined plane. The resulting free space under the angled coil 13 can likewise be used for a connection device 23. Here too, an insulator 24 supports a copper conductor 25 against the coil 12.

The coil 11 marked at the front in FIG. 3 is angled downward. The plane which is spanned by its center line 15 in its arced area runs parallel to the front face 10 of the laminated core 9. The coil 11 is angled again here, i.e. its contour 26 observed in the longitudinal view or the center line of the vertices of its sub-conductor arcs occupies the angle β in respect of the inclined plane 19. The angle of the contour 26 to the plane defined by the center line 15 is accordingly 90°-β. A connection device 27 is also arranged in the slope area of the coil 11. Here it comprises an insulator 28, which here supports a first copper conductor 29 and a second copper conductor 30 against the coil 11.

Since the sub-conductors of a coil (coils 11 and 13 in the example shown in FIG. 3) do not lie perpendicularly one over the other, the remaining cavities between the coils may be put to better use. The sub-conductors of the coils are shortened from plane to plane, so that just the requisite distances for clearance and creepage are maintained. The conductor lengths and therefore the losses are reduced. The space requirement is reduced and the resulting cavities can be used for construction of the ring circuit or for insertion of cables or cooling supply lines.

The cable length in the winding head can thus be advantageously minimized, with the result that losses are reduced and effectiveness is increased. The demonstrated principle can not only be implemented for three-plane windings, as shown in FIG. 3, but can also be applied in each concentric coil.

By applying the inventive construction principle, the coils of the different phases (e.g. if the coils 11, 12 and 13 are assigned to phases U, V and W) generally have a different length. Since the ohmic resistance of the coils is incidental to the operating behavior, this does not generally have any negative impact.

What is claimed is:

1. An active part of an electrical machine, comprising:
   a carrier having a front face and defining a main axis;
   a winding head area; and
   a plurality of coils arranged on the carrier and having each a plurality of sub-conductors, said coils projecting out from the front face of the carrier in an arced shape into the winding head area and being connected to one another, each of the coils having a coil arc in the winding head area and defining a center line which essentially runs in a plane in the coil arc, with the sub-conductors of the coil running parallel to the plane in the coil arc and configured to form sub-conductor arcs having vertices that define a line of inclination which extends at an angle to the front face of the carrier and at an angle to the main axis of the carrier,
   wherein three adjacent ones of the coils define planes which are arranged at angles of 0°, 45° and 90° in relation to the front face of the carrier.

2. The active part of claim 1, constructed in the form of member selected of the group consisting of a stator and a rotor.

3. The active part of claim 1, further comprising a connecting element arranged on the line of inclination of the sub-conductor arcs of the coil.

4. The active part of claim 2, wherein the plurality of coils are arranged in spaced-apart relationship, with the planes of the adjacent coils arranged at an angle relative to one another in the winding head area.

5. The active part of claim 1, wherein the three adjacent coils are assigned the phases U, V and W of a three-phase system.

6. The active part of claim 1, wherein the three coils are of different lengths.

7. A motor or generator, comprising an active part which includes a carrier having a front face and defining a main axis, a winding head area, and a plurality of coils arranged on the carrier and having each a plurality of sub-conductors, said coils projecting out from the front face of the carrier in an arced shape into the winding head area and being connected to one another, each of the coils having a coil arc in the winding head area and defining a center line which essentially runs in a plane in the coil arc, with the sub-conductors of the coil running parallel to the plane in the coil arc and configured to form sub-conductor arcs having vertices that define a line of inclination which extends at an angle to the front face of the carrier and at an angle to the main axis of the carrier, wherein three adjacent ones of the coils define planes which are arranged at angles of 0°, 45° and 90° in relation to the front face of the carrier.

8. The motor or generator of claim 7, further comprising a member selected of the group consisting of a stator and a rotor.

9. The motor or generator of claim 7, wherein the active part has a connecting element arranged on the line of inclination of the sub-conductor arcs of the coil.

10. The motor or generator of claim 8, wherein the plurality of coils are arranged in spaced-apart relationship, with the planes of the adjacent coils arranged at an angle relative to one another in the winding head area.

11. The motor or generator of claim 7, wherein the three adjacent coils are assigned the phases U, V and W of a three-phase system.

12. The motor or generator of claim 7, wherein the three coils are of different lengths.

* * * * *